(12) United States Patent
Chen et al.

(10) Patent No.: US 11,569,871 B2
(45) Date of Patent: Jan. 31, 2023

(54) VARIABLE RATE MIMO FOR MULTI-USER COMMUNICATIONS INVOLVING AIRBORNE PLATFORMS

(71) Applicant: SYRACUSE UNIVERSITY, Syracuse, NY (US)

(72) Inventors: Biao Chen, Jamesville, NY (US); Yang Liu, San Jose, CA (US); Janek Mroczek, Barneveld, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 0 days.

(21) Appl. No.: 17/523,538

(22) Filed: Nov. 10, 2021

(65) Prior Publication Data
US 2022/0149902 A1 May 12, 2022

Related U.S. Application Data
(60) Provisional application No. 63/111,836, filed on Nov. 10, 2020.

(51) Int. Cl.
*H04B 7/26* (2006.01)
*H04B 7/0413* (2017.01)
*H04L 25/02* (2006.01)

(52) U.S. Cl.
CPC ............. *H04B 7/0413* (2013.01); *H04B 7/26* (2013.01); *H04L 25/0202* (2013.01)

(58) Field of Classification Search
CPC ................................ H04B 7/0413; H04B 7/26
See application file for complete search history.

(56) References Cited

U.S. PATENT DOCUMENTS
9,419,330 B1 * 8/2016 Gans .................. H04B 7/18502
* cited by examiner

*Primary Examiner* — Rahel Guarino
(74) *Attorney, Agent, or Firm* — David Nocilly

(57) ABSTRACT

A multiple-input multiple-output (MIMO) communication system that addresses three major challenges in airborne MIMO communications, namely, antenna blockage due largely to the movement and orientation of the airborne platforms, the presence of unknown interference inherent to the intended application, and the lack of channel state information (CSI) at the transmitter. The system is implemented on a Diagonal Bell-Labs Layered Space-Time (D-BLAST) MIMO architecture and includes spatial spreading to counter antenna blockage, temporal spreading to mitigate signal to interference and noise ratio degradation due to intended or unintended interference, and a simple low rate feedback scheme to enable real time adaptation in the absence of full transmitter CSI.

12 Claims, 10 Drawing Sheets

$$\mathbf{H}_{n_r \times n_t} = \begin{bmatrix} h_{1,1} & \cdots & 0 & \cdots & h_{1,n_t} \\ h_{2,1} & \cdots & 0 & \cdots & h_{2,n_t} \\ \vdots & \vdots & \vdots & \vdots & \vdots \\ 0 & \cdots & 0 & \cdots & 0 \\ \vdots & \vdots & \vdots & \vdots & \vdots \\ h_{n_r,1} & \cdots & 0 & \cdots & h_{n_r,n_t} \end{bmatrix}$$

$i^{th}$ transmit antenna blocking $\quad j^{th}$ receive antenna blocking

FIG. 2

VARIABLE RATE MIMO FOR MULTI-USER COMMUNICATIONS INVOLVING AIRBORNE PLATFORMS

STATEMENT REGARDING FEDERALLY SPONSORED RESEARCH OR DEVELOPMENT

This invention was made with government support under Grant No. FA8750-18-1-0065 awarded by the United States Air Force and Grant No. 1731237 of the National Science Foundation (NSF). The government has certain rights in the invention.

BACKGROUND OF THE INVENTION

1. Field of the Invention

The present invention relates to airborne communication systems and, more specifically, to a multiple-input multiple-output (MIMO) communication system having temporal and spatial spreading along with low rate feedback.

2. Description of the Related Art

Airborne networks are an integral part of most situational awareness systems. An imperative to the success of such situational awareness systems is the ability to reliably deliver high throughput low latency data from these airborne platforms. Traditional communication systems that rely on single-input/single-output (SISO) technique are often inadequate to support the data rate required by communication from aerial platforms to ground station.

Multiple-Input Multiple-Output (MIMO) communications are a key enabling technology for current and future generation wireless systems because of its superior spectrum efficiency. By utilizing parallel spatial channels constructed through pre-processing at the transmitter and equalization at the receiver, the throughput is shown to scale linearly in the number of transceiver antennas in the high signal to noise ratio (SNR) regime. An additional advantage is privacy—due to spatial multiplexing and reduced transmit power, the chance that unintended users can recover the messages is reduced.

However, linear scaling of throughput in the number of transceiver antennas is typically attained for a rich scattering environment. The spatial diversity in such environment ensures that the channels between different transmit-receiver element pairs are sufficiently different, leading to a well behaving channel matrix. With airborne platforms, MIMO communications face the unique challenge due to the lack of a scattering environment. For example, with only line of sight transmission, the keyhole effect renders the throughput gain logarithmic instead of linear. The keyhole effect, however, assumes a 'small aperture' system where transceiver array aperture is orders of magnitude smaller than the transmission distance. With airborne platforms (e.g., an aircraft), a large transceiver aperture can be realized and they are typically much larger than hand-held devices. Indeed, using a realistic setting in both aperture size and transmission distance, it has been shown that significant capacity gain can still be attained even if only line of sight is assumed. The large antenna spacing on an airborne platform mitigates the 'keyhole' effect because of the distinct distances between transmit elements and receive elements. As such, channel gains between different transceiver elements are meaningfully different, leading to the desired spatial diversity even when scatters are scarce.

While the potential for throughput gains gives incentive to consider MIMO technology for airborne communications, there are unique challenges that need to be overcome when airborne platforms are involved. For example, the following three challenges are most often encountered in airborne communications for situational awareness missions.

Channel Impairment Due to Antenna Blockage

This is unique to airborne platforms when antennas need to conform to the shape of the platform. Clearly, movement of the airborne platform and orientation relative to its communicating party often lead to blockage of some antenna elements. This is exacerbated by the lack of scattering as the blockage cannot be compensated by indirect paths, leading effectively to antenna outage, i.e., transmissions from blocked transmit antenna elements never reach any receive antenna element or that blocked receive antenna elements never receive any signals from the transmitter.

Interference

Clearly, for situational awareness applications, unintended or intentional interference will need to be addressed for the system to have robust connectivity in a realistic operating environment. Another complicating factor in situational awareness systems is the dynamic nature of the RF environment; interference may itself be highly time varying hence requiring a simple yet adaptive mitigation scheme.

The Lack of Transmitter Channel State Information (CSI)

With airborne platforms, the mobility of the transmitter and/or receiver results in a highly dynamic channel environment. It is unrealistic to have the receiver send the entire CSI to the transmitter. Thus. the CSI is typically not available at the transmitter side. Additionally, for some applications, the throughput requirement is highly asymmetrical, e.g., video streaming from airborne platforms to ground stations requires much more bandwidth than command and control signals in the reverse link. As such, channel reciprocity, even if it holds, may not be helpful in such applications.

Accordingly, there is a need in the art for an airborne communication system that can compensate for antenna blockage due largely to the movement and orientation of the airborne platforms, the presence of unknown interference inherent to the intended application, and the lack of channel state information (CSI) at the transmitter.

BRIEF SUMMARY OF THE INVENTION

The present invention is a system for airborne communication systems that overcomes conventional problems by integrating three key design approaches: spatial spreading to counter antenna blockage; temporal spreading to mitigate signal to interference and noise ratio degradation due to intended or unintended interference; and a simple low rate feedback scheme to enable real time adaptation in the absence of full transmitter CSI. In a first embodiment, the present invention comprises an airborne multiple-input multiple-output (MIMO) communication system including a first MIMO transceiver having a first plurality of antennas that is programmed to transmit a plurality of data streams over a plurality of channels and to selectively adapt a spatial spreading factor and a temporal spreading factor governing spatial spreading and temporal spreading of the plurality of data streams according to a low rate feedback signal received by the first MIMO transceiver and a second MIMO transceiver having a second plurality of antennas that is programmed to receive the plurality of data streams, to determine a bit error rate of the plurality of data streams, to generate the low rate feedback signal based on the bit error rate, and to transmit the low rate feedback signal to the first MIMO transceiver. The first and second MIMO transceivers implement a Bell Laboratories Layer Space-Time (BLAST) architecture. The spatial spreading factor is adapted according to current channel state information obtained from channel estimation performed by the second MIMO transceiver. The temporal spreading factor is adapted according to a detected performance at the second MIMO transceiver. The detected performance is determined based on frame pass rate.

In another embodiment, the present invention is a method of providing airborne communications where the first step involves providing a first MIMO transceiver having a first plurality of antennas that is programmed to transmit a plurality of data streams over a plurality of channels and to selectively adapt a spatial spreading factor and a temporal spreading factor governing spatial spreading and temporal spreading of the plurality of data streams according to a low rate feedback signal received by the first MIMO transceiver. A next step involves providing a second MIMO transceiver having a second plurality of antennas that is programmed to receive the plurality of data streams, to determine a bit error rate of the plurality of data streams, to generate the low rate feedback signal based on the bit error rate, and to transmit the low rate feedback signal to the first MIMO transceiver. A further step involves sending the plurality of data streams over the plurality of channels from the first MIMO transceiver to the second MIMO transceiver. An additional step involves determining the bit error rate of the plurality of data streams received by the second MIMO transceiver. A next step involves forming the low rate feedback signal based on the bit error rate. A further step involves sending the bit error rate to the first MIMO transceiver. A last step involves adjusting the spatial spreading factor or the temporal spreading factor if the bit error rate received by the first MIMO transceiver indicates a loss of performance.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 2 is an illustrated equation showing how antenna blockage manifests itself in a rank deficient channel matrix.

DETAILED DESCRIPTION OF THE INVENTION

Figure 1:
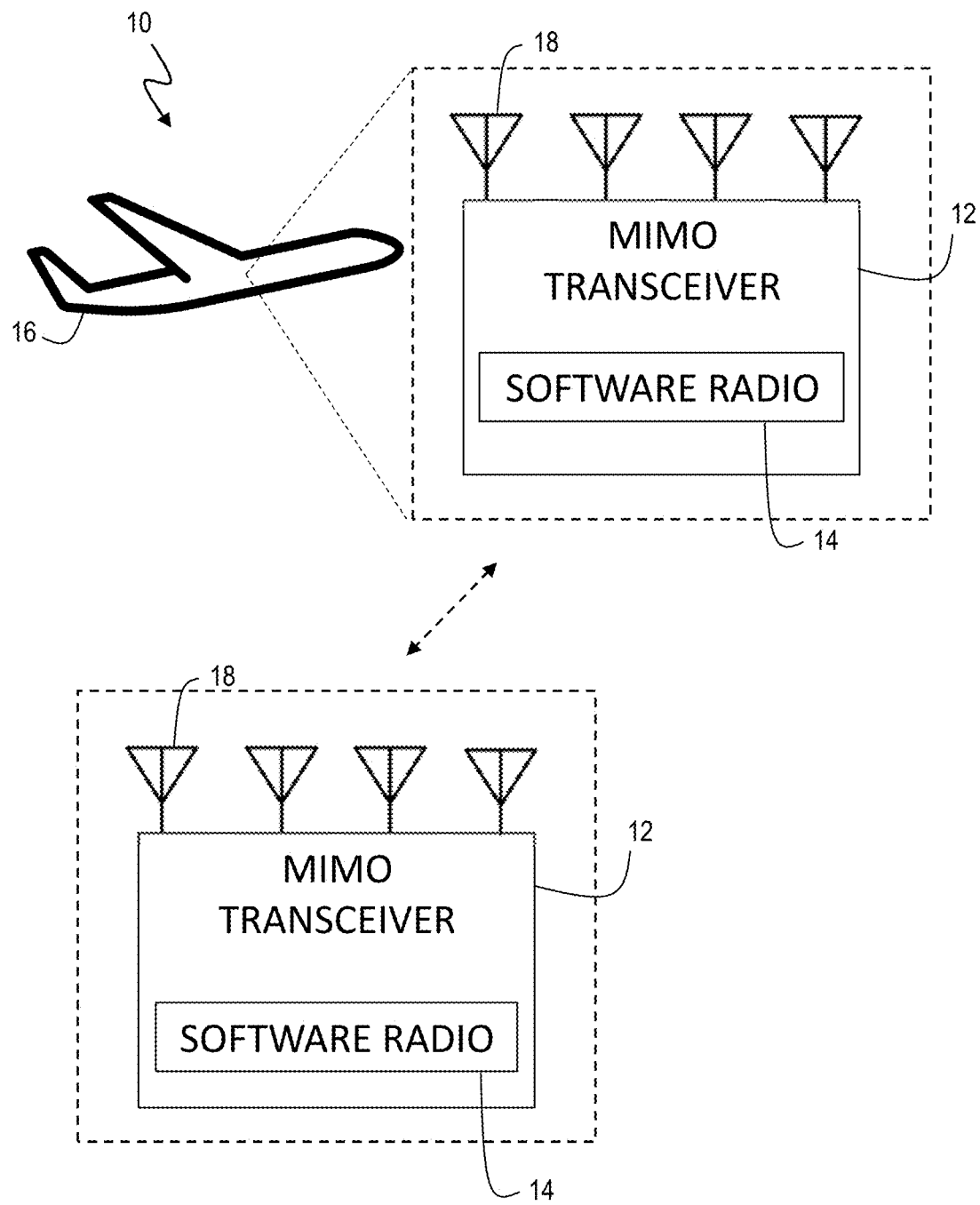
FIG. 1 is a schematic of an airborne communication system according to the present invention.

Referring to the figures, wherein like numeral refer to like parts throughout, there is seen in FIG. 1 an airborne communication system 10 according to the present invention. Airborne communication system 10 comprises an adaptive multiple-input multiple-output (MIMO) system having at a minimum, a series MIMO transceivers 12 programmed according to the present invention to implement three critical signal processing and design components according to the present invention. For example, MIMO transceivers 12 may be programmed to implement software defined radios (SDR) 14, but it should be recognized that hardware defined radios may be used as well. At least one of the pair of MIMO transceivers 12 and accompanying software defined radio 14 may be positioned on an aircraft 16. System 10 is configured via SDR 14 to implement spatial spreading to combat rank deficient channel matrix due to blocking of any one or more of antenna elements 18 of MIMO transceiver 12, temporal spreading to boost SINR when operating under strong interference, and a low rate feedback scheme for transceiver adaptation. System 10 integrates temporal and spatial spreading into the classical D-BLAST architecture and includes a low rate feedback scheme is designed to drive the adaptation, ensuring autonomous operation under dynamically varying channel conditions.

Example 1

System 10 was demonstrated with a fully adaptive MIMO system built on the D-BLAST (Diagonal Bell Labs Layered Space-Time) architecture. The D-BLAST architecture was chosen as the baseline system primarily due to its ability to operate in the absence of transmitter CSI and its optimality in terms of outage capacity. However, D-BLAST in itself is not sufficient in addressing the loss of degrees of freedom in the presence of antenna blockage or severe signal to interference and noise power ratio (SINR) degradation due to interference. Accordingly, three critical signal processing and design components into the baseline D-BLAST system to address the above challenges: spatial spreading to combat rank deficient channel matrix due to antenna blocking, temporal spreading to boost SINR when operating under strong interference, and a low rate feedback scheme for transceiver adaptation.

These three components were specific designed to cooperate when incorporated into system 10. For example, while spatial spreading is primarily used to mitigate antenna outage, it can also improve SINR at the receiver. Nevertheless, adaptation of spreading factors in spatial and temporal domains is driven by different channel impairments, hence needs to be handled differently. Antenna blockage leads to ill-conditioned channel matrices, whose remedy requires the reduction of data streams to accommodate for the loss of degrees of freedom. Spatial spreading is thus called for in such a situation. Temporal spreading, on the other hand, is used to boost the SINR at the receiver, hence the actual receiver performance (e.g., measured SINR or bit error rate (BER)) is used to drive temporal spreading adaptation. Finally, choosing the simple spreading based approach as opposed to, say, more sophisticated schemes (e.g., space time code to counter antenna blockage) enables the use of a low rate feedback for adaptation: with spreading, the transmitter only needs to be informed by the receiver the desired spreading factors. Together, temporal and spatial spreading collectively provide a range of transmission states that help balance spectrum efficiency with the need for robust connectivity in the presence of various channel impairments.

Consider a MIMO system with $n_t$ transmit and $n_r$ receive antennas. We model a narrowband channel by channel matrix H. Thus the received baseband samples Y can be expressed as $$y = Hx + w \quad (1)$$

where $x \in \mathbb{C}^{n_t}$ is the $n_t \times 1$ transmit signal vector, $y \in \mathbb{C}^{n_r}$ is the $n_r \times 1$ receive signal vector, and $w \sim CN(0, N_0 I_{n_r})$ is the additive white Gaussian noise vector.

In the absence of CSI (i.e., knowledge of H at the transmitter), the D-BLAST architecture rotates independent data streams across the transmit antennas, thus effectively averaging out disparate channel states across transmit antenna elements without the need for complete CSI. The D-BLAST architecture, together with successive interference cancellation is known to be optimal in terms of outage capacity.

Antenna blockage is a unique challenge in airborne MIMO communications; the existence of line-of-sight depends on the orientation of the platforms which are constantly moving. When a transmit or receive antenna element is completely out of sight, the lack of scattering in an airborne environment often renders the element in effective outage as there may not exist any secondary paths.

Antenna blockage manifests itself in a rank deficient channel matrix. Specifically, if transmit antenna i is in outage, the i th column of the channel matrix H is effectively 0. Likewise, if receiver antenna j is in outage, the j th row of the channel matrix H is an all zero vector. This is illustrated in FIG. 2.

For the original D-BLAST, with transmit element outage, data streams emitted from the element in outage are completely lost. When a receive element is in outage, the receive antenna array may not have sufficient degrees of freedom to resolve independent data streams of the D-BLAST system. In either case, significant performance loss is expected due to the rank deficiency of the channel matrix.

With a single interference source, the received signal can be expressed as $$y = Hx + h^J x^J + w \quad (3)$$

where $x^J \in \mathbb{C}$ is interference signal and $h^J \in \mathbb{C}^{n_r}$ represents the vector channel from the interference source to the receiver. For this interference model, sophisticated signal processing techniques can be developed to mitigate the interference. For example, if one has knowledge of the channel vector $h^J$, zero-forcing or other nulling schemes can be applied. This, however, requires knowledge about the interference source which may not be available in a highly dynamic environment. Additionally, multiple interference sources may exist and the receiver array may not have the necessary degrees of freedom to null out all the interference. The presence of interference (or its residue even if pre-processing can be done to partially alleviate their effect) may lead to significant SINR degradation.

Spatial Spreading

In the absence of transmit CSI, it is infeasible to use any antenna selection scheme in real time for reliable communication. Spatial spreading introduces redundancy across antenna elements, thereby maintaining connectivity even if some transmit elements are in outage. On the other hand, if some receive antenna elements are in outage, spatial spreading at the transmitter reduces the number of effective spatial data streams, ensuring that receiver has sufficient degrees of freedom to resolve independent data streams.

Specifically, spatial spreading is a simple repetition scheme where identical symbols are transmitted using multiple transmit antennas. Specifically, antennas are grouped into subgroups; identical symbols are transmitted by antennas within the same subgroup. Grouping can be done strategically by antenna location in an airborne platform to maximize diversity within each group. Spatial spreading factor (SSF) is used to determine the number of subgroups. For example, when SSF=1, there is no spatial spreading and the number of subgroups is the same as the number of transmit antennas. With a 4×4 MIMO system, there are three distinct spreading factors: 1, 2 and 4, and the transmission states corresponding to these SSFs are illustrated in Table 1. Clearly, SSF=1 amounts to no spreading (i.e., the original D-BLAST) while SSF=4 amounts to maximum spatial redundancy (note that this simple repetition is different from beamforming as the latter requires CSI that is unavailable at the transmitter).

TABLE 1

Spatial spreading under 4X4 MIMO

| SSF | Antenna | Symbols |
| --- | --- | --- |
| 1 | 1 | $x_1$ |
|   | 2 | $x_2$ |
|   | 3 | $x_3$ |
|   | 4 | $x_4$ |
| 2 | 1 | $x_1$ |
|   | 2 | $x_1$ |
|   | 3 | $x_3$ |
|   | 4 | $x_3$ |
| 4 | 1 | $x_1$ |
|   | 2 | $x_1$ |
|   | 3 | $x_1$ |
|   | 4 | $x_1$ |

Temporal Spreading

While a myriad of signal processing techniques can be used for mitigating interference, their implementation invariably requires some knowledge of the interference source, e.g., directivity information for zero forcing. With unknown interference, proactive measures need to be taken at the transmitter to boost the effective signal to interference noise ratio (SINR) at the receiver. A simple scheme is the use of temporal spreading (i.e., introducing redundancy in time) to improve SINR at the expense of reduced spectrum efficiency.

Temporal spreading is to encode independent data streams using orthogonal codes (e.g., Walsh codes) in order to boost SINR at the receiver. The scheme is simple and requires no prior information on interference and is driven by the effective receiver SINR through low rate feedback. Temporal spreading factor (TSF) is used to determine the length of the spreading code (hence the level of temporal redundancy) assigned to each antenna. Table 2 describes how temporal spreading is done in the 4×4 MIMO system under different spreading factors (1, 2 and 4). Note that temporal spreading factor is not limited by the number of transmit antennas.

The introduced redundancy in the temporal domain improves the effective SINR at the expense of spectrum efficiency. By controlling the spreading factor, the system can balance efficiency and robustness without any knowledge of the interference sources.

TABLE 2

Temporal spreading under 4X4 MIMO

| TSF | Antenna | Spreading Codes | Symbols |
|-----|---------|-----------------|---------|
| 1   | 1       | [1]             | $x_1$   |
|     | 2       | [1]             | $x_2$   |
|     | 3       | [1]             | $x_3$   |
|     | 4       | [1]             | $x_4$   |
| 2   | 1       | [1, 1]          | $x_1, x_1$ |
|     | 2       | [1, −1]         | $x_2, -x_2$ |
|     | 3       | [1, 1]          | $x_3, x_3$ |
|     | 4       | [1, −1]         | $x_4, -x_4$ |
| 4   | 1       | [1, 1, 1, 1]    | $x_1, x_1, x_1, x_1$ |
|     | 2       | [1, −1, 1, −1]  | $x_2, -x_2, x_2, -x_2$ |
|     | 3       | [1, 1, −1, −1]  | $x_3, x_3, -x_3, -x_3$ |
|     | 4       | [1, −1, −1, 1]  | $x_4, -x_4, -x_4, x_4$ |

Low Rate Feedback for Adaptation

While spatial and temporal spreading can mitigate the effect of antenna blockage and interference, their integration in the system requires a highly adaptive scheme where the choice of spreading factors matches the operating condition. Since spreading is done at the transmitter, limited feedback is required for transceiver adaptation. A simple low rate feedback is designed whose overhead is much smaller than sending back a quantized version of the CSI.

The use of spatial and temporal spreading for balancing the need for efficiency and reliability makes it possible to use an extremely low rate feedback to drive the transmission rate adaptation (i.e., selection of spreading factors). With an n×n MIMO, at most $\log_2 \lceil n \rceil +1$ SSFs are needed, where $\lceil \cdot \rceil$ is the ceiling function, i.e., the smallest integer greater than or equal to the argument. For example, with 4×4 system, three SSFs are available: 1, 2 and 4. Thus the total number of bits required to represent those spreading factors is no greater than $\lceil \log_2(1+\lceil \log_2 n \rceil) \rceil$.

In fact, taking into account the continuity of the operating environment, only three feedback states will be needed for spatial mode adaptation regardless of how large the antenna element number is. Specifically, depending on the channel estimate, the receiver can request that the spreading factor either stays the same, increases, or decreases; thus only two bit feedback is sufficient for spatial mode adaptation regardless of how large n is. The same is true for temporal adaptation, with the difference being that the effective receive SINR (or its proxy such as BER or FPR) is used to determine the temporal spreading factor. Clearly, the required feedback is drastically reduced compared with any system that attempts to feedback quantized CSI to the transmitter.

Figure 3:
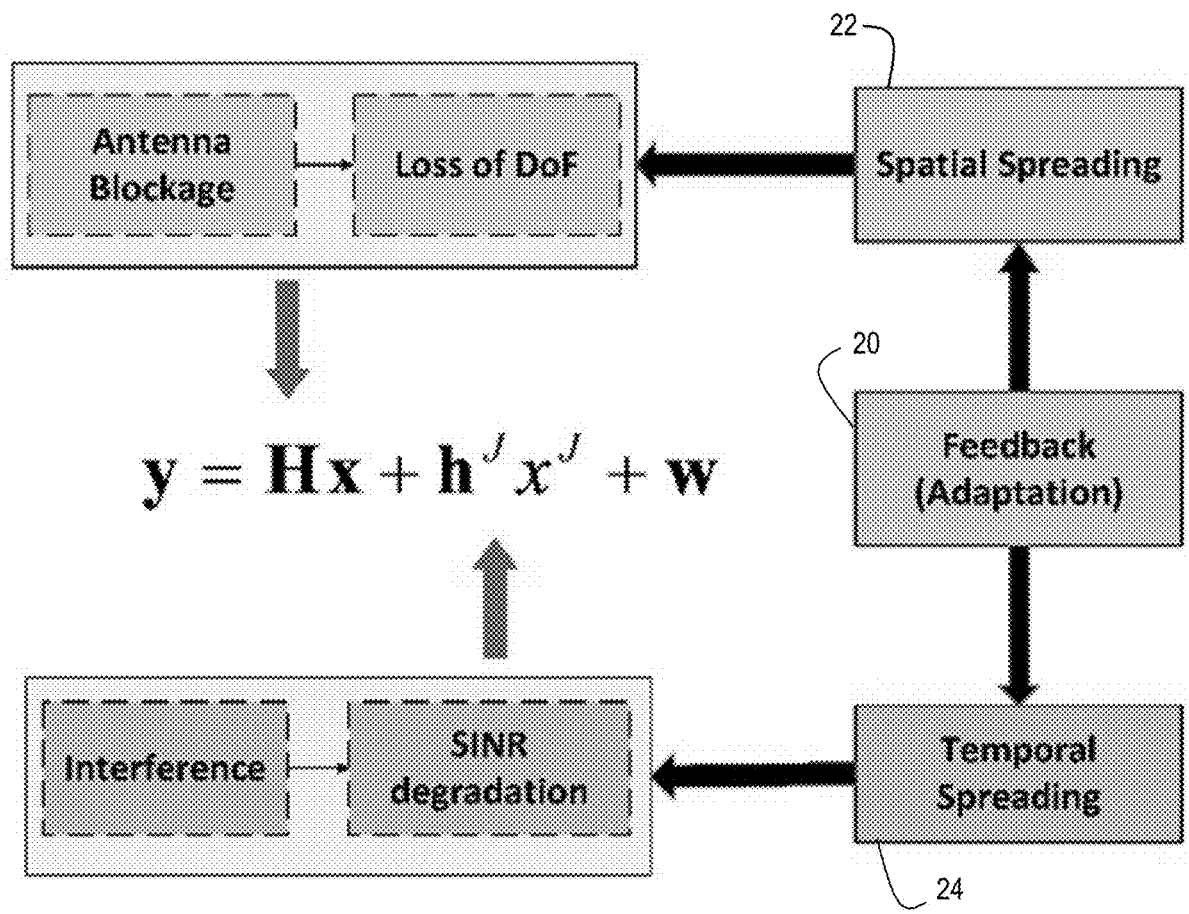
FIG. 3 is a schematic of the feedback approach of the present invention.

FIG. 3 illustrates the tree design components. Whenever performance loss is observed at MIMO transceiver 12 acting as the receiver, a low rate feedback scheme 20 is used to drive spreading factor adaptation in order to maintain connectivity. If performance degradation is due to loss of degrees of freedom (i.e., antenna blockage), spatial spreading factor will be increased by spatial spreading module 22. On the other hand, if the degradation is due to low SINR (e.g., the presence of interference), temporal spreading factor will be adjusted by temporal spreading module 24 accordingly.

Figure 4:
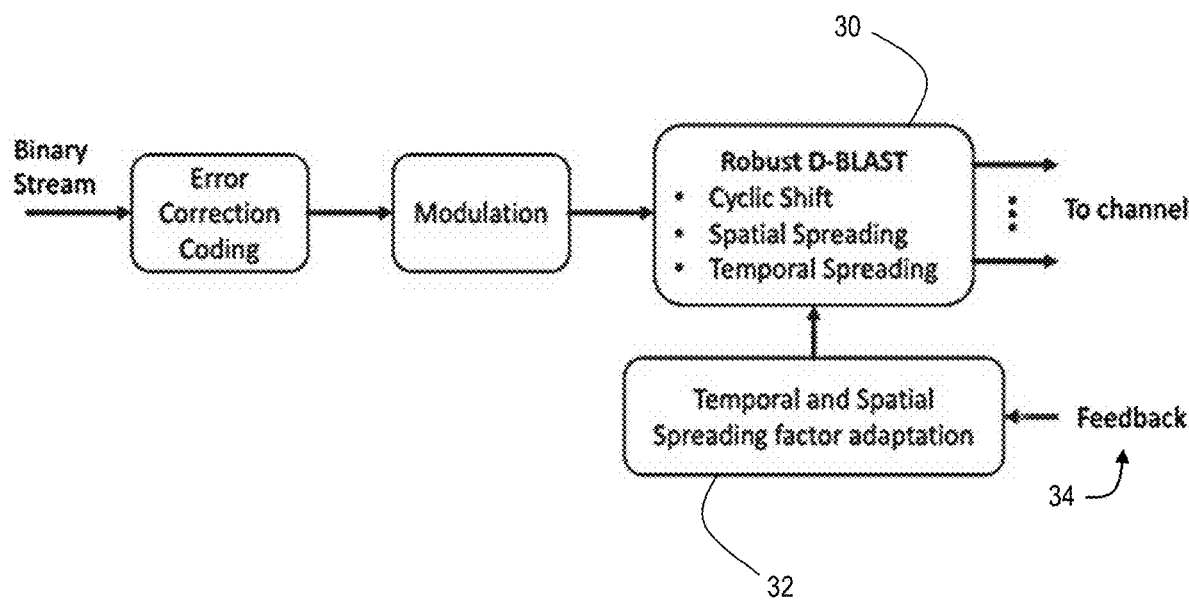
FIG. 4 is block diagram of a MIMO transmitter according to the present invention.
Figure 5:
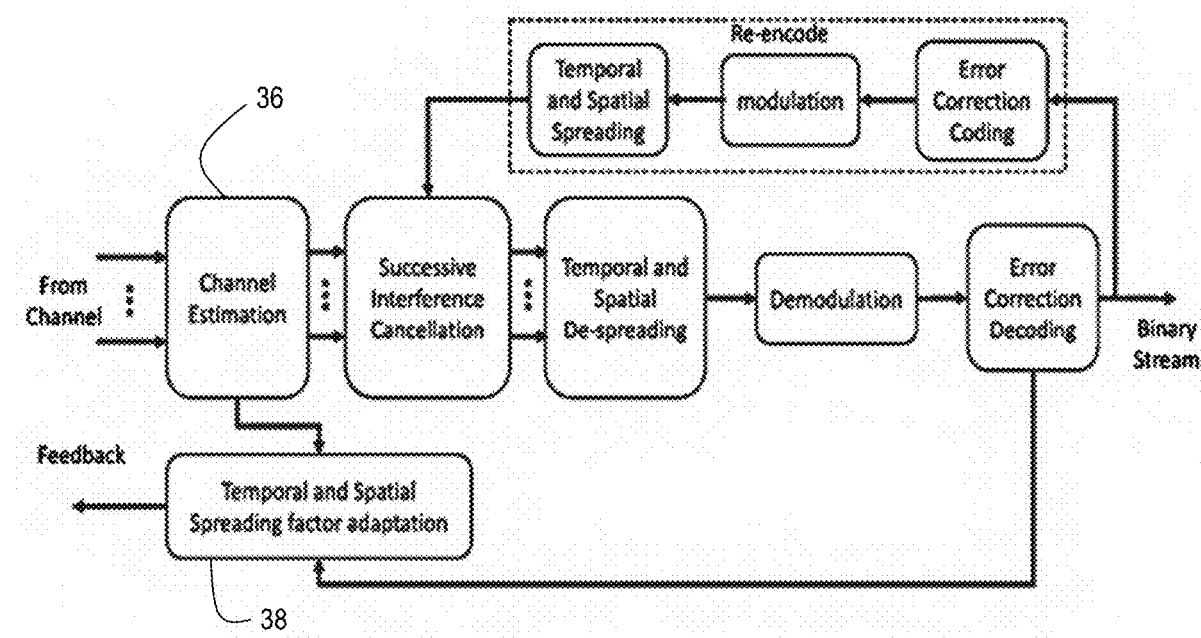
FIG. 5 is block diagram of a MIMO receiver according to the present invention.

A high level description of the transceiver architecture of the proposed robust MIMO system is depicted in FIG. 4 and FIG. 5. At the transmitter side seen in FIG. 4, spatial and temporal spreading is integrated in D-BLAST processing 30 to introduce redundancy. Spreading factor adaptation 32 is done through a low rate feedback 34 from the receiver. At the receiver side seen in FIG. 5, current CSI (or the condition number of the channel matrix, which serves as a proxy for channel condition) obtained from the channel estimation block 36 is used to determine the desired spatial spreading factor 38. On the other hand, detection performance (e.g., frame pass rate (FPR), computed with the help of CRC check) or estimated SINR using preambles is used to determine the temporal spreading factor. These spreading factors will be sent back to the transmitter for mode adaptation.

The three components of the present invention are illustrated using 4×4 MIMO system, which is consistent with an actual SDR system described herein. The software radio implementation utilizes GNU Radio platform (version 3.7) while over the air transmission is enabled by USRP N210. USRP Hardware Driver (UHD) (version 3.10) is used to facilitate data transfer between host computers and USRPs.

The 4×4 MIMO system consisted of 8 USRP N210s, each equipped with an SBX-40 daughterboard. With Ettus MIMO cables, only two N210s can be connected to form a 2×2 system. To build a 4×4 MIMO using N210s, external oscillators and PPS signals are used at both the transmitter and the receiver. Specifically, an external 10 MHz oscillators from Crystek and a micro-controller board, an Arduino Leonardo, are used at the transmitter to provide common frequency and time reference for the four devices respectively. The receiver is similarly configured by using a separate 10 MHz oscillator and Arduino.

The transmitter and receiver arrays were placed on shelves at the opposite ends of a rectangular room with a dimension of 39 feet by 13 feet. The shelves are elevated high enough such that there is a strong line of sight component between any transmit and receive antenna element pairs. Throughout this section, the wireless channel for the MIMO experiment uses carrier frequency at 2.45 GHz and bandwidth of 675 kHz.

A high level abstraction of the transmitter and receiver is shown in FIG. 4 and FIG. 5, respectively. Various processing blocks at the transmitter and receiver are built under the GNU Radio framework. The developed 4×4 MIMO system operates autonomously when various channel impairments are introduced; a fully functioning feedback mechanism is used to drive the needed adaptation. In addition to spatial and temporal spreading factor adaptation, we have also incorporated modulation adaptation as used in almost all existing wireless systems. Four levels of modulation were incorporated in the system: BPSK, QPSK, 8PSK, and 16QAM. Along with spatial and temporal spreading, these modulations provide even more granularity in balancing the need for spectrum efficiency and robustness (while coding rate adaptation can also be built into the system, a fixed error correction code—BCH(439,511) code—was used for simplicity of implementation).

System 10 was designed to adapt to various channel conditions and the corresponding communication performance at the receiver. The bit error rate performance corresponding to various spatial spreading factors under the impairment of antenna blockage with a static radio was used. Specifically, the same antenna blockage scenarios were repeated for different but fixed spatial spreading factors and the corresponding bit error rate performance was examined. The BER difference provides a meaningful guidance on how spatial spreading affects receiver performance when operating condition varies.

The bit error performance of a MIMO communication system with different but fixed spreading factors under varying antenna blockage scenarios was examined. Antenna blockage was emulated by controlling the gain parameters of the software radios that are used to implement the 4×4 MIMO system. The test environment as described in the previous section is otherwise a static one with stationary scatters. With blocked antenna elements, H becomes close to rank deficient and the largest singular value becomes increasingly dominant.

The following quantity was defined as a measure of how ill-conditioned the channel matrix is $$P(H) = \frac{\sigma_1(H)}{\sum_{i=1}^{4} \sigma_i(H)} \quad (4)$$

where $\sigma_i(H)$ for $1 \leq i \leq 4$ are the singular values of H in decreasing order. Thus P(H) measures the concentration of the channel energy in the dominant eigen channel. The larger it is, the more ill-conditioned the channel matrix becomes. Notice that in this experiment we do not use condition number since it becomes effectively infinity when one or more antennas are taken off-line. Thus, the condition number cannot distinguish between the cases when either one or two or three antennas are taken off-line.

Figure 6:
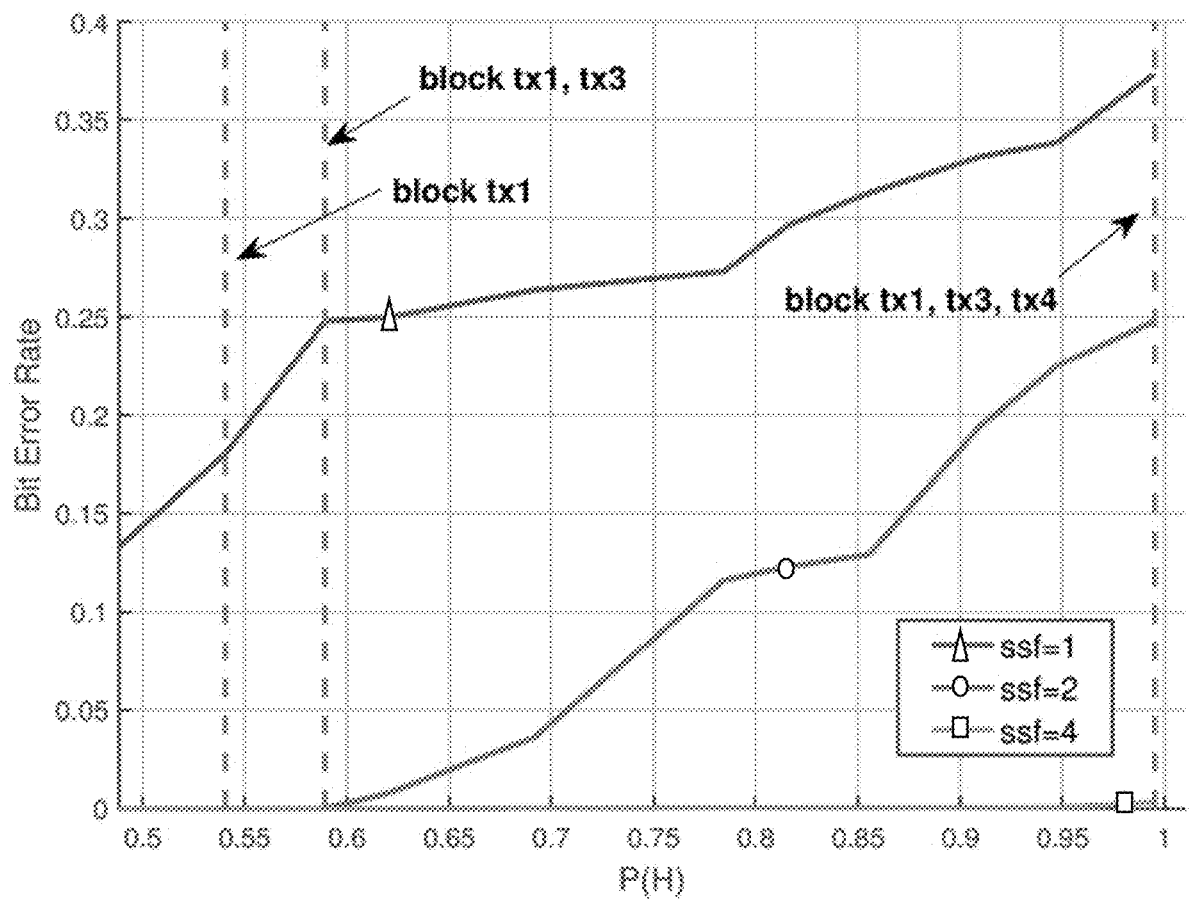
FIG. 6 is a graph of the performance of different SSFs when transmit antennas are blocked.
Figure 7:
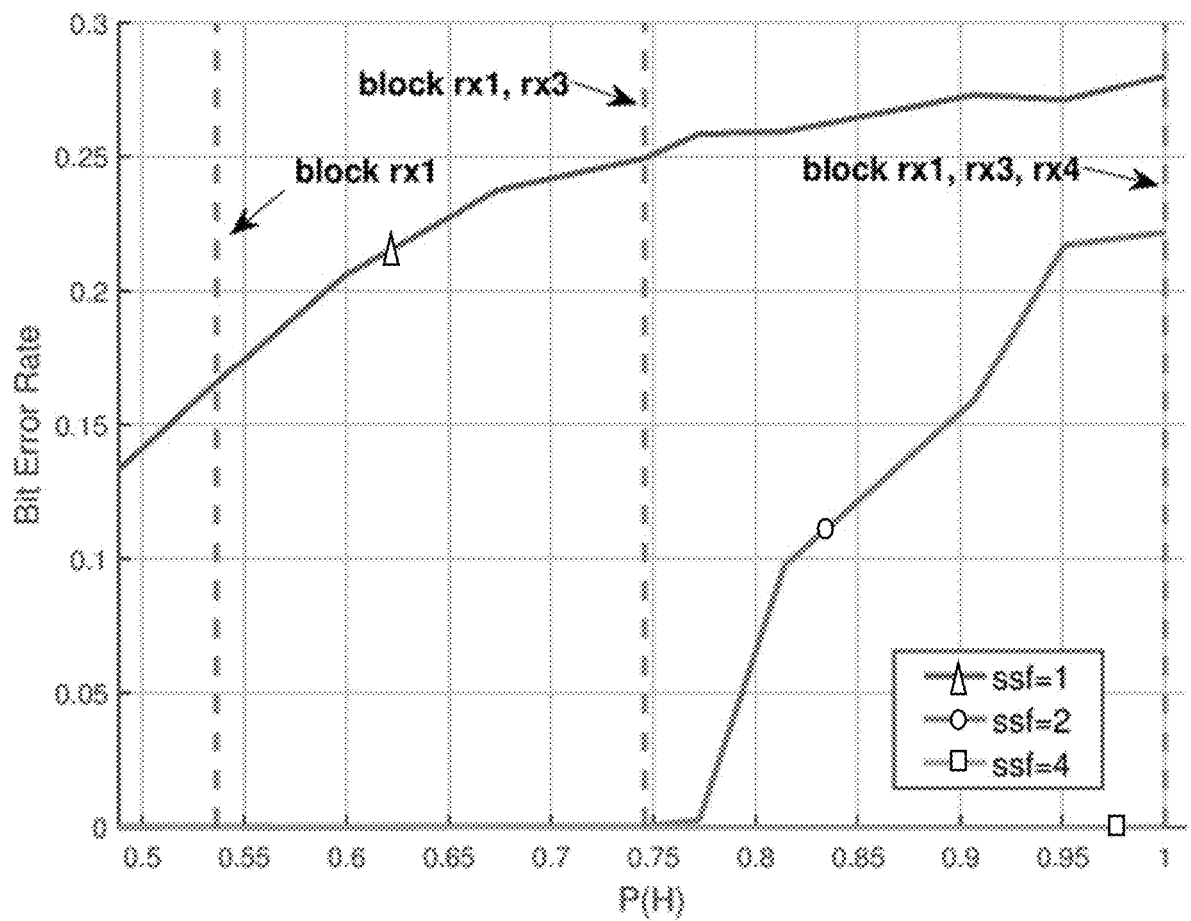
FIG. 7 is a graph of the performance of different SSFs when receive antennas are blocked.

The experiment started with no blockage (all antenna elements have equal gains and signal amplitudes). In subsequent phases, antenna gains and signal amplitudes of certain transmit/receive antennas are deliberately controlled such that P(H) gradually increases to its maximum value 1 (i.e., the channel matrix becomes a rank one matrix). FIG. 6 and FIG. 7 summarize the performance of three SSFs when antenna blockage happens at the transmitter and receiver respectively. Clearly, spatial spreading helps maintain system connectivity in the presence of antenna outage due to blockage. If we group the antennas strategically according to their relative locations, SSF=2 can provide reasonable performance when up to two antennas are off-line. At the extreme case, with SSF=4, while throughput is compromised because of high spatial domain redundancy, connectivity is maintained throughout the communication process despite the lack of knowledge of the exact antenna outage at the transmitter and receiver.

The performance of the overall system was examined through a comprehensive experiment with video streaming and under various channel impairments. The channel impairments were designed to emulate that encountered in airborne communications. The received signals were then parsed off-line to obtain various performance metrics to fully understand the behavior of the developed MIMO system. For video streaming, the laptop that controls the transmitter uses FFmpeg tool to break down the video file into UDP packets, which are transmitted using the 4×4 MIMO system. At the receiver, the delivered UDP packets are decoded and displayed using the media player (FFplay tool). The transmission state is represented by the triple (SSF, TSF, Mod) which denote respectively spatial spreading factor SSF∈{1, 2, 4}, temporal spreading factor TSF∈{1, 2, 4}, and modulation index Mod∈{0, 1, 2, 3} corresponding to BPSK, QPSK, 8PSK, and 16QAM respectively (c.f. Table 3).

The video streaming experiment in the presence of antenna blockage was examined. Again, antenna blockage is done through deliberately altering the transmit power of various antenna elements, including taking them completely offline, thus emulating the situation when some antennas may experience partial or complete blockage.

For this test, the condition number κ(H) of the estimated channel matrix was used as a proxy for channel conditions: a small (close to 1) condition number suggests a full-rank channel matrix environment while a large condition number indicates an ill-conditioned channel that is close to rank deficient. The reason that condition number can be used here is because the experiment is controlled in a way that at most one antenna may be taken completely off-line. The experiment is conducted with a three-minute transmission consisting of five different stages. Each stage corresponds to a different channel condition by altering the transmit power to emulate different level of antenna blockage.

For the receiver performance, frame pass rate (FPR) was used to track the reception performance. While frame duration is fixed, each frame may contain different numbers of UDP packets since modulation order and spreading factors are varying (adapting) depending on the operation condition. FPR directly correlates to the video streaming performance as dropped frames will cause video to freeze or pixelate. Table 3 provides a summary of the adaptation corresponding to the five stages which we describe in details below.

TABLE 3

Adaptation of (SSF, TSF, Mod) over five stages

| stage | adaptation | κ (H) |
|---|---|---|
| 1 | (1, 1, 1) → (1, 2, 1) → (1, 2, 2) → (1, 2, 1) | [10, 15] |
| 2 | (1, 2, 1) | [20, 35] |
| 3 | (1, 2, 1) → (1, 4, 1) → (1, 4, 2 → (1, 4, 3) | [30, 45] |
| 4 | (1, 4, 3) → (2, 2, 3) | [1000, ∞] |
| 5 | (2, 2, 3) → (1, 2, 3) → (1, 4, 3) | [33, 50] |

Stage 1 was the initial stage and the four USRPs had equal transmit power (amplitude=0.2, gain=20 dB) in this stage. The transmitter started with both temporal spreading factor and spatial spreading factor equal to 1 and QPSK is the default modulation scheme. Since κ(H) is much larger than 1 ([10,15]) none of the frames can be decoded initially and streaming does not commence with the original setting. Temporal spreading was requested through feedback, and once TSF is increased to 2, streaming started as FPR improves to nearly 100%. As a side note, the system also attempted to move to higher order modulation, leading to a decrease of FPR to around 83%. This drove the modulation back to QPSK in subsequent frames through feedback adaptation.

Stage 2 involved a manual decreased in the gain at transmit antenna 1 by 10 dB; this emulates the situation when partial antenna blockage occurs. However, with TSF equal to 2, the reception performance was not negatively affected thus the transmission mode stayed the same. Video streaming continued uninterrupted.

Stage 3 involved a deterioration of the channel condition further by reducing the tx gain at antenna 4 by 12 dB. At the onset of this change, the quality of the streaming video was very poor, which is consistent with the steep drop of the FPR at the beginning of Stage 3. The system quickly adapted to increase TSF to 4, which was reduced to effectively transmitting a single data stream. However, once its FPR moved back to 100%, modulation order was adapted from QPSK to 8PSK and then to 16QAM which compensated for the throughput loss due to the increased TSF.

Stage 4 involved a forced complete antenna outage. Specifically, antenna 1's amplitude was set at 0, which effectively silenced its transmission. As seen from the table, the corresponding condition number for Stage 4 is exceedingly large, indicating a completely rank deficient channel matrix. Spatial spreading was enabled through feedback to compensate for the rank deficiency of the channel matrix. Whenever the system increases spatial spreading, it would first try to lower temporal spreading to balance the need for spectrum efficiency. In this case, it turned out reducing TSF to 2 can sustain a frame success rate close to 100%. Again, video streaming quality directly correlates with the FPR: it deteriorated initially at the beginning of Stage 4 and then recovered once the transmission adaptation was complete.

Stage 5 involved the outage element (antenna 1) being brought back online (i.e., end of blockage). As expected, the adaptation eventually led to the same transmission state as in stage 3 and video streaming continued uninterrupted when the transmission mode stabilized.

Figure 8:
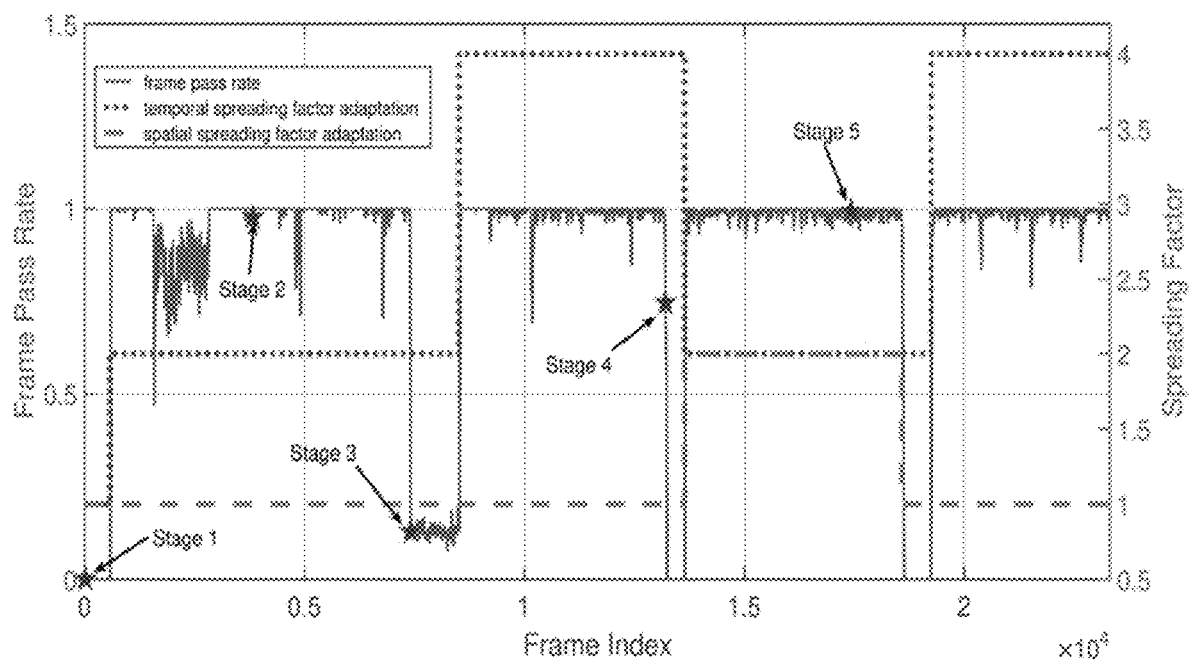
FIG. 8 is a graph of reception performance over five different stages of antenna blockage.

FIG. 8 summarizes the performance and spreading adaptation for the entire five stages through parsing of the received signal. The frame pass rate (hence video streaming quality) often suffers at the onset of a change in channel condition or the beginning of a new transmission mode. Nevertheless, the built-in adaptation always leads to the desired transmission mode for successful video streaming, demonstrating the robust connectivity in the presence of dynamic channel impairments.

To emulate an interference environment, an additional USRP N210 was placed on the shelf of a side wall. Its distances to the transmitter and the receiver are respectively 13 feet and 26 feet.

In the experiment, the interference source is transmitting randomly generated QPSK signals. The transmit power of the MIMO transmitter was fixed while gradually adjusting the transmission power of the interference source to observe how the system reacts to different interference powers (or equivalently, SINR at the receiver). Denote by $p_s$ the average receive power at a receive USRP when only the MIMO transmitter is transmitting and $p_i$ the average receive power when only the interference source is transmitting. The interference state is represented by the difference $p_s - p_i$.

Experiment Part I

In this part, the MIMO system was tested with different temporal spreading factors to determine how well it would perform in combating interference, thus feedback was disabled and the modulation scheme was fixed as QPSK throughout this experiment.

Table 4 summarizes the performance of different configurations in three interference states. SSF was omitted since the experiments were conducted in the lab environment, while interference degrades SINR, no antenna blockage occurs hence no spatial spreading is needed. The first row corresponds to the state that there is no interference. The second and third rows correspond to different interference powers; both temporal spreading factors (2 and 4) give reasonable performance though 4 is clearly better than 2.

Experiment Part II

Upon observing the system performance with the three states separately, a single experiment run was conducted with three interference states sequentially occurring. Adaptation via feedback is enabled for this part.

Figure 9:
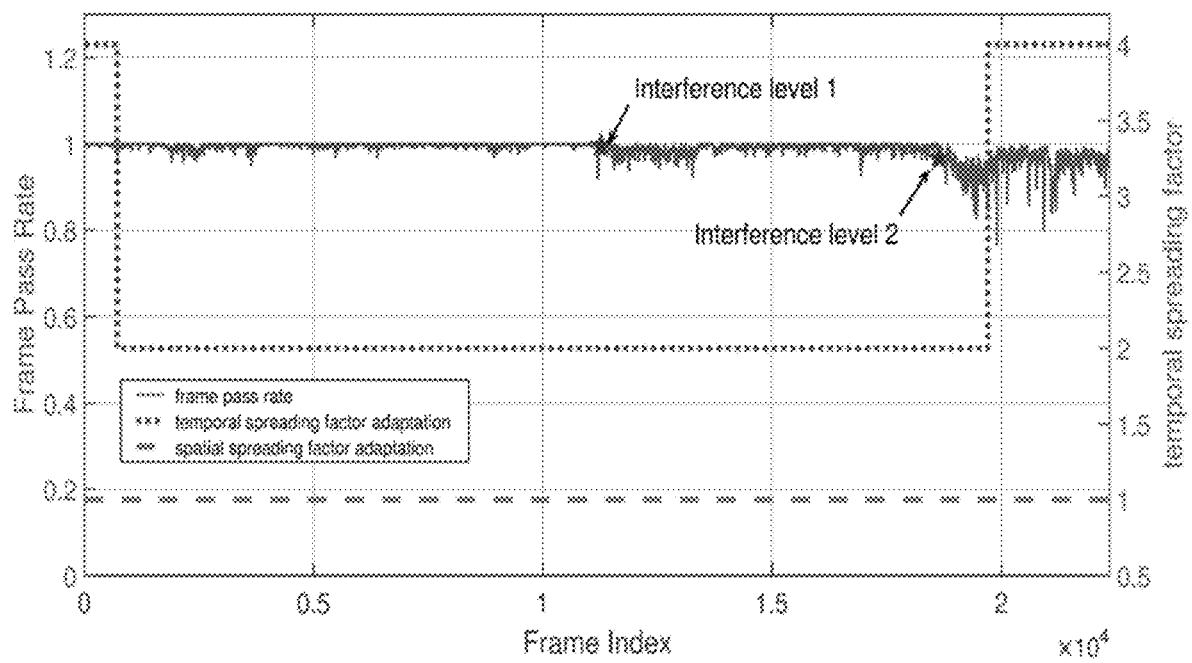
FIG. 9 is a graph of reception performance over three stages of interference levels.

The results are seen in FIG. 9. The SSF stayed at 1 throughout the experiment since no antenna blockage was detected. Also, no adaptation in the modulation scheme was observed (i.e., QPSK is always used). For the initial state (no interference), the system quickly locked into the desired TSF at 2. As the interference state transitioned into a low interference power (i.e., State 2), FPR exhibited some initial fluctuation but quickly stabilized without the need for adjusting the spreading factor. Once the interference power increased further (State 3), TSF was increased to compensate for the decreased SINR. The adaptation is consistent with the results in Table 4.

TABLE 4

Error performance with interference

| Stage index | Power diff | TSF | FPR | BER |
|---|---|---|---|---|
| 1 | NA | 2 | 0.9911 | 0.0003 |
|  |  | 4 | 1.0 | 0.0 |
| 2 | 9 dB-10 dB | 2 | 0.9188 | 0.0044 |
|  |  | 4 | 0.9995 | 0.0002 |
| 3 | 4 dB-5 dB | 2 | 0.7047 | 0.0187 |
|  |  | 4 | 0.9528 | 0.0051 |

To understand the advantage of the MIMO system against interference, the same experiment was repeated for a single input single output (SISO) system. For the SISO experiment, the transmit antenna is fixed, and the four receive antennas are tested sequentially. The reception performance was quite disparate even with temporal spreading factor at the maximum value 4. Three out of the four receivers were in complete outage (i.e., could not even synchronize with the header) when the interference is present while the fourth one had reasonable performance. Clearly, with SISO, the reception is completely at the mercy of SINR as the signal and interference overlap completely. With MIMO receiver, spatial diversity provides desired immunity to interference.

Example 2

Figure 10:
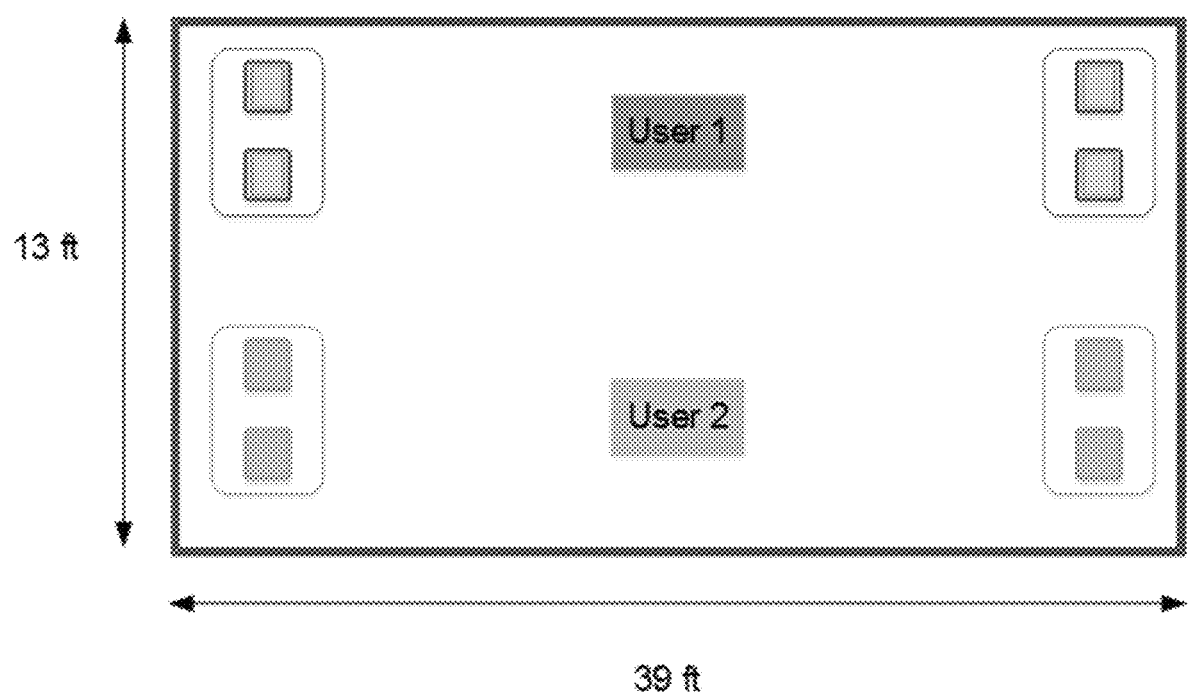
FIG. 10 is a schematic of an experiment applying VR MIMO transmissions to a multi-user MIMO system.

The present invention was also tested by applying the VR MIMO transmissions to a multi-user MIMO system. Given the limited USRP units in the lab, the experiment was limited to involving two pairs of MIMO transmitter-receivers, both implementing VR MIMO. The two 2×2 MIMO systems are placed at the opposite end of the lab as shown in FIG. 10. The distance between two closest antennas is greater than half the wavelength ($\lambda$ is 0.12 m given a center frequency of 2.45 GHz). Therefore, the channel experienced by different antenna pairs are meaningfully different.

Throughout the experiment, the two systems were running independently using identical VR-MIMO code with different transmission parameters including carrier frequency $f_c$ and bandwidth $b_w$. For both systems, the modulation orders were fixed at QPSK, temporal spreading factors are set to be 2 (TSF=2) while spatial spreading factors are disabled (SSF=1). Additionally, two transmitters had equal transmit power (gain=20, signal amplitude=0.2). The observations are summarized as below:

1. $f_{c,1} = f_{c,2}$ and $b_{w,1} = b_{w,2}$, that is, two users are transmitting signals at a completely overlapping frequency band. Due to large interference, both receivers cannot even synchronize to frames from their transmitters.
2. $f_{c,1} = f_{c,2}$ and $b_{w,1} = 0.5 b_{w,2}$. The packets from the second user with larger bandwidth begin to go through and the corresponding frame pass rate is around 80%, while the first user still cannot decode anything.
3. $f_{c,1} = f_{c,2}$ and $b_{w,1} = 0.25 b_{w,2}$ As we further decrease bandwidth of the first system by half, the performance of the second system has more obvious improvement (>95%). However, the first user still suffers.
4. Let $b_{w,1} = b_{w,2}$, and adjust $f_{c,1}$, $f_{c,2}$ such that two users have half of their bands overlapping with each other. Frame pass rates of both system are around 85%.

5. Let $b_{w,1}=b_{w,2}$ adjust $f_{c,1}$, $f_{c,2}$ such that two systems have only one fourth of the band in common. Under this scenario, frame pass rates of both systems are above 95%.

Clearly, frequency overlap appears to be the dominating factor that determines the performance for the multi-user MIMO with VR MIMO implementation. In comparison, with the original DBLAST MIMO, frame pass rates are consistently 0 in all the above scenarios. Again, the VR MIMO exhibited much improved co-existence potential compared with DBLAST MIMO.

The invention was also demonstrated with two DJI drones to see how they handled interference with each other. The two drones were placed side by side and were both streaming live videos to their respective controllers. One drone was viewed as the unknown interference source while the other one was treated as the transmitter. Both drones were operating at ISM 2.4 GHz band and had a discrete set of 20 MHz frequency bands to choose from (from channel 1 to channel 11). When the interfering drone is forced to use the same frequency band as the transmitter using the manual band selection, the transmitter quickly jumps to other cleaner bands and video streaming continues without obvious interruption. The transmitted was then forced to also use the same band as the interfering drone. The video freezes immediately due to low SINR. As the interference drone is moved away from the transmitter, the video streaming starts to pick up even though the quality is poor (long latency and pixelated video frames). This experiment demonstrated that, while drones have the capability of interference avoidance through MAC layer adaptivity (i.e., by changing to a different frequency band), they do not have the PHY layer adaptivity to handle in-band interference. This suggests the potential of improved connectivity by integrating VR MIMO according to the present invention for airborne communication. While MAC layer adaptation works in a normal environment, its ability to maintain connectivity will be severely limited in a crowed RF environment, i.e., when all channels are being occupied by swarms of drones.

What is claimed is:

1. An airborne multiple-input multiple-output (MIMO) communication system, comprising:
    a first MIMO transceiver having a first plurality of antennas that is programmed to transmit a plurality of data streams over a plurality of channels and to selectively adapt a spatial spreading factor and a temporal spreading factor governing spatial spreading and temporal spreading of the plurality of data streams according to a low rate feedback signal received by the first MIMO transceiver; and
    a second MIMO transceiver having a second plurality of antennas that is programmed to receive the plurality of data streams, to determine a bit error rate and a channel condition of the plurality of data streams, to generate the low rate feedback signal based on the bit error rate and the channel condition, and to transmit the low rate feedback signal to the first MIMO transceiver.

2. The system of claim 1, wherein the first MIMO transceiver implements a Bell Laboratories Layer Space-Time (BLAST) architecture.

3. The system of claim 2, wherein the second MIMO transceiver also implements the Bell Laboratories Layer Space-Time (BLAST) architecture.

4. The system of claim 3, wherein the spatial spreading factor is adapted according to current channel state information obtained from channel estimation performed by the second MIMO transceiver.

5. The system of claim 4, wherein the temporal spreading factor is adapted according to a detected performance at the second MIMO transceiver.

6. The system of claim 5, wherein the detected performance is determined based on frame pass rate.

7. A method of providing airborne communications, comprising the steps of:
    providing a first MIMO transceiver having a first plurality of antennas that is programmed to transmit a plurality of data streams over a plurality of channels and to selectively adapt a spatial spreading factor and a temporal spreading factor governing spatial spreading and temporal spreading of the plurality of data streams according to a low rate feedback signal received by the first MIMO transceiver;
    providing a second MIMO transceiver having a second plurality of antennas that is programmed to receive the plurality of data streams, to determine a bit error rate and a channel condition of the plurality of data streams, to generate the low rate feedback signal based on the bit error rate and the channel condition, and to transmit the low rate feedback signal to the first MIMO transceiver;
    sending the plurality of data streams over the plurality of channels from the first MIMO transceiver to the second MIMO transceiver;
    determining the bit error rate and the channel condition of the plurality of data streams received by the second MIMO transceiver;
    forming the low rate feedback signal based on the bit error rate and the channel condition;
    sending the low rate feedback signal to the first MIMO transceiver; and
    adjusting the spatial spreading factor or the temporal spreading factor if the low rate feedback signal received by the first MIMO transceiver indicates a loss of performance.

8. The method of claim 7, wherein the first MIMO transceiver is implementing a Bell Laboratories Layer Space-Time (BLAST) architecture.

9. The method of claim 8, wherein the second MIMO transceiver is also implementing the Bell Laboratories Layer Space-Time (BLAST) architecture.

10. The method of claim 9, wherein the spatial spreading factor is adapted according to current channel state information obtained from channel estimation performed by the second MIMO transceiver.

11. The method of claim 10, wherein the temporal spreading factor is adapted according to a detected performance at the second MIMO transceiver.

12. The method of claim 11, wherein the detected performance is determined based on frame pass rate.

* * * * *